Jan. 16, 1962 E. D. HARRIS 3,017,523
TRANSISTOR EXCLUSIVE-OR CIRCUIT WITH GAIN
Filed Dec. 10, 1958
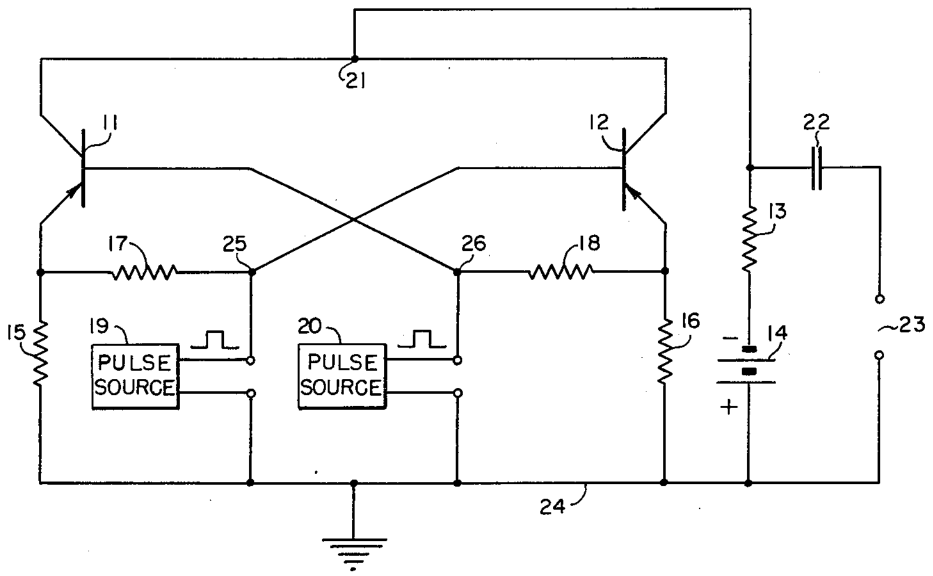
INVENTOR
ELLIS D. HARRIS
BY Richard C. Reed
ATTORNEY 3,017,523

TRANSISTOR EXCLUSIVE-OR CIRCUIT WITH GAIN

Ellis D. Harris, 56 Elizabeth St., Apt. 1, Salt Lake City, Utah

Filed Dec. 10, 1958, Ser. No. 779,509
2 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

The present invention relates to a logical circuit of the type used in electronic computers and the like. In particular, the present invention relates to a transistorized Exclusive-Or circuit having a net signal gain.

In pulse coding systems and certain other types of systems there is often a need for a network which can perform non-carry over addition of two pulse trains. Such a network is characterized by two isolated inputs into which the two pulse trains are fed, and an output from which output pulses emerge. The network is so constructed that identical output pulses are obtained when a pulse is applied to either input, but no pulse is obtained when pulses are supplied simultaneously to both inputs. The logical name for this network is an Exclusive-Or circuit.

In specific applications, certain other properties of the circuit become important. Since the signals will suffer some attenuation in the network, and further, may be required to drive other networks connected to the output, it is desirable that the network supply an appreciable signal gain. In airborne applications, it is important that the circuit be compact and lightweight. From the standpoint of economy and reliability, it is better to have a circuit which has as few elements as possible, and particularly to avoid those which are expensive and/or subject to damage or failure. Finally, it is desirable that the operation of the network be fast acting and relatively independent of the input waveform.

It is, therefore, an object of the present invention to provide an Exclusive-Or network with gain which is compact, lightweight, reliable, inexpensive, rugged, fast acting and relatively independent of the input waveforms.

A further object of the present invention is to provide an Exclusive-Or circuit utilizing transistors to obtain the desirable characteristics set forth above.

These and other objects of the invention are best understood with reference to the accompanying drawings.

In the figures there is shown an embodiment of the present invention. The network includes two transistor amplifiers 11 and 12, which in this case are type SB–100 P.N.P. Other types of transistors might have been used, including NPN types, bearing in mind that the latter require applied voltages of opposite polarity to those shown in FIG. 1. The collectors of amplifiers 11 and 12 are connected at junction 21 and share a common load resistor 13 and collector source 14. The source is grounded and provides a negative voltage, through the load resistor 13, to place the collector approximately three volts below ground. A load of 4700 ohms proved satisfactory in the circuit shown.

The bias resistors 15 and 16, connected between the emitters of amplifiers 11 and 12, respectively, and the ground return 24, limit the emitter current flow between input pulses and thereby prevent collector current from flowing through the load resistor 13. A suitable value for resistors 15 and 16 is approximately 1100 ohms. Input resistors 17 and 18 are connected to the emitters of amplifiers 11 and 12, respectively, to form, with resistors 15 and 16, input voltage dividers. Across each of the voltage dividers is connected one of the input sources 19 and 20. The input resistors used in this specific embodiment had values of 470 ohms.

To complete the network, the base of transistors 11 and 12 are connected, respectively, to the ends 26 and 25 of the voltage dividers which are remote from the ground return, and thereby provide a cross-coupling between the two amplifiers.

A positive pulse applied across either voltage divider will raise the voltage of the emitter which is associated with that voltage divider. Thus, the potential on the emitter of transistor 11 is raised by a pulse from input source 19. Assuming that no pulse is being emitted by input source 20, the base of transistor 11 will be substantially grounded through the voltage divider associated with the emitter of transistor 12. The resulting base current induced by the emitter-to-base voltage permits collector current to flow, which in turn induces an output voltage across D.C. load resistor 13. If desired, the output pulse may be applied to the output terminals 23 through a conventional coupling condenser 22. Other well known arrangements, as for example, an output transformer are equally satisfactory.

On the other hand, if both input sources emit positive pulses simultaneously, the potential on the bases of both transistors rises to a value higher than that which appears on the respective emitters. The difference in potential in each case is determined by the voltage dividers. Collector current is therefore inhibited in both amplifiers.

The principle of operation of the above circuit makes it unnecessary to preshape the input signal. The simple switching action prevents any output with simultaneously applied input pulses. The symmetry of the network insures that the same response will be obtained for signals applied at either input.

The transistors in this network serve the dual purpose of amplifying and gating the input signals. This provides great economy, since the transistors represent a large fraction of the total cost of the network. The use of transistors also yields near ideal gating properties and permits a compact lightweight construction. The structure of the circuit is such that the voltage and power requirements are held to a minimum.

Further modifications of the basic invention, which are substantially equivalent to the specific embodiments disclosed herein, will be obvious to those skilled in the art. The scope of the invention, therefore, is limited only as specified in the appended claims.

What is claimed is:

1. An Exclusive-Or network comprising, a first and second transistor each having emitter, base and collector terminals, a first and second source of input signals of a given polarity, a first signal path connected between the base terminal of said first transistor and said second signal source, a second signal path connected between the base terminal of said second transistor and said first signal source, voltage divider means connected to each of said sources for providing input signals of reduced magnitude, a third signal path connecting the voltage divider means of said first source to the emitter of said first transistor, a fourth path connecting the voltage divider means of said second source to the emitter of said second transistor, whereby said input signals of reduced amplitude are cross-coupled to the emitters of said transistors, and a common output means connected to the collector terminals of both said first and second transistors for combining the resulting output signals from said transistors.

2. The network according to claim 1 wherein said voltage divider means is a pair of resistors serially connected across the output of each source.

References Cited in the file of this patent

UNITED STATES PATENTS

| | | |
|---|---|---|
| 2,636,133 | Hussey | Apr. 21, 1953 |
| 2,757,280 | Beard | July 31, 1956 |
| 2,853,632 | Gray | Sept. 23, 1958 |
| 2,903,602 | Fleisher | Sept. 8, 1959 |
| 2,946,898 | Jensen | July 26, 1960 |

OTHER REFERENCES

"The Junction Transistor as a Computing Element," part 2, by Wolfendale et al. in "Electronic Engineering," February 1957, pages 83–87.